April 23, 1957 E. W. FORKNER 2,789,672
CLUTCH AND VARIABLE SPEED DRIVE PROVIDED WITH AUTOMATIC
ACCELERATION AND DECELERATION MECHANISM FOR PUNCH
AND BLANKING PRESSES AND THE LIKE
Filed July 27, 1953 3 Sheets-Sheet 1

INVENTOR.
EWELL W. FORKNER
BY
Zugelter & Zugelter
Attys.

INVENTOR.
EWELL W. FORKNER

April 23, 1957　　　　E. W. FORKNER　　　　2,789,672
CLUTCH AND VARIABLE SPEED DRIVE PROVIDED WITH AUTOMATIC
ACCELERATION AND DECELERATION MECHANISM FOR PUNCH
AND BLANKING PRESSES AND THE LIKE
Filed July 27, 1953　　　　　　　　　　　　　3 Sheets-Sheet 3
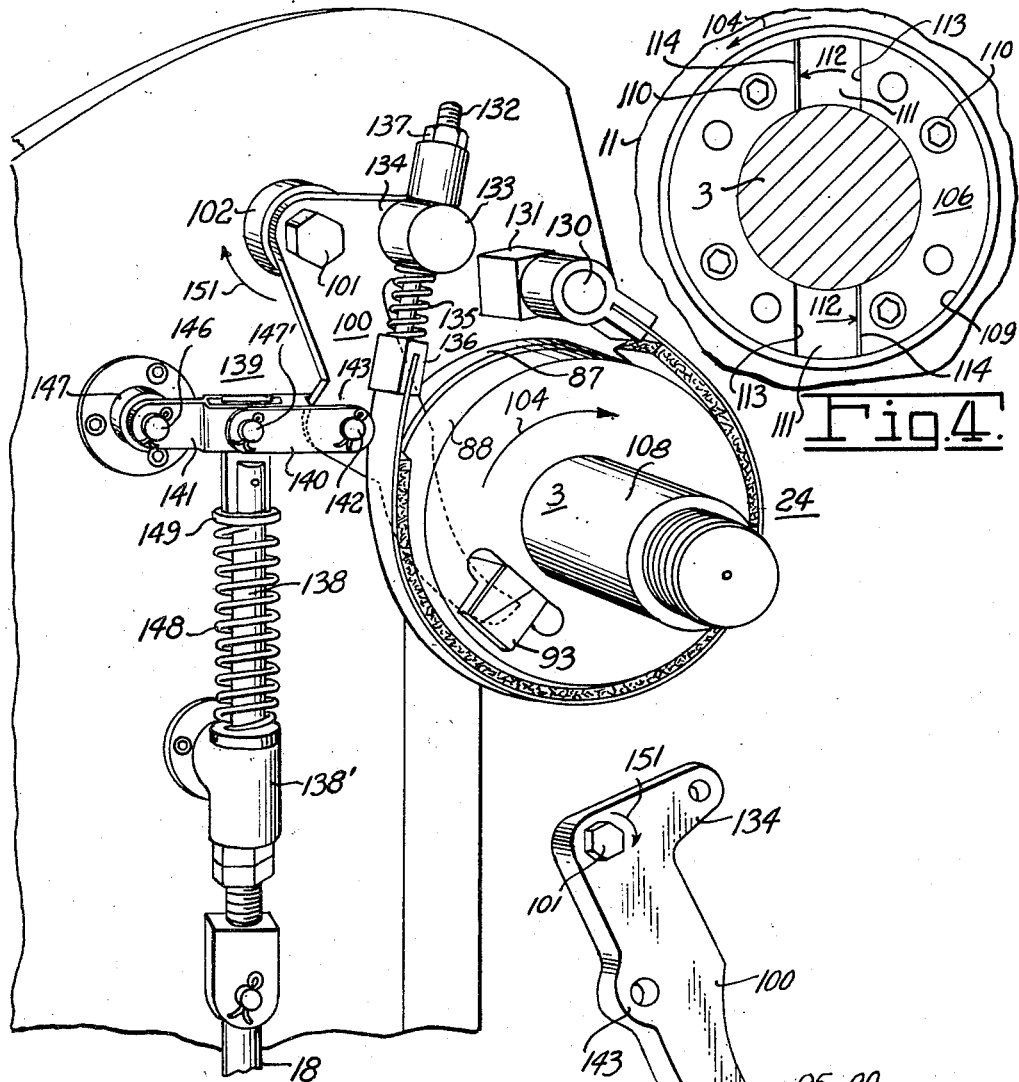
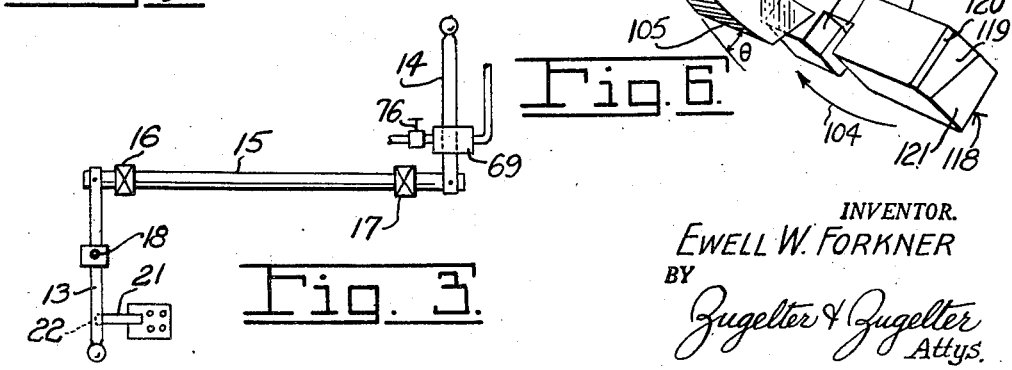
INVENTOR.
EWELL W. FORKNER
BY
Zugelter & Zugelter
Attys.

United States Patent Office 2,789,672
Patented Apr. 23, 1957

2,789,672

CLUTCH AND VARIABLE SPEED DRIVE PROVIDED WITH AUTOMATIC ACCELERATION AND DECELERATION MECHANISM FOR PUNCH AND BLANKING PRESSES AND THE LIKE

Ewell W. Forkner, Cincinnati, Ohio, assignor to Precision Flexopress Corporation, Cincinnati, Ohio, a corporation of Ohio Application July 27, 1953, Serial No. 370,346

12 Claims. (Cl. 192—3.5)

This invention relates to punch and blanking presses and the like, and more particularly to clutches for engaging and disengaging the fly wheels and crank shafts, and to variable speed drives therefor.

An object of this invention is to provide a variable speed drive for presses of the above-stated types, having means for effecting automatic acceleration of the fly wheel and crank shaft when the clutch is engaged, and providing automatic deceleration of the fly wheel when the clutch is disengaged.

Another object of the invention is to provide a clutch and variable speed transmission for presses of the type set forth above, which is provided with means for automatically accelerating the fly wheel and crank shaft when the clutch is engaged, automatically decelerating the fly wheel and crank shaft when the clutch is disengaged, and in which the rate of acceleration or deceleration, or both, may be adjusted and controlled.

Another object of the invention is to provide a clutch and variable speed drive, as above set forth, in which the variable speed drive may be adjusted to predetermine the maximum speed of the fly wheel and shaft.

A still further object of the invention is to provide a clutch and variable speed transmission, as above set forth, in which the means for providing automatic acceleration and deceleration are controlled to operate in unison with the means for actuating the clutch to or from disengaged position, so that the clutch is engaged at a low fly wheel speed and disengaged at the high speed thereof.

A still further object of the invention is to provide a shot pin clutch for engaging and disengaging the fly wheel and crank shafts of punch presses, that is so constructed that the tolerance or clearance between the clutch pin and the socket in which it is received in the fly wheel, is so close that the pin has a sliding fit with the pin socket and substantially no play between the pin and socket walls.

A still further object of the invention is to provide a shot pin clutch of the type set forth in the preceding object, which is so constructed that it can be engaged while the fly wheel is turning at a predetermined speed without harmful impact on the pin, and with a minimum of noise.

Other objects of the invention will be apparent to those of ordinary skill in the art to which the invention pertains, from the following description and drawings.

In the drawings:

Figure 1 is a view in perspective of a press of the punch and blanking type, provided with a variable speed drive and clutch arranged and constructed, respectively, in accordance with an embodiment of the invention;

Fig. 2 is a more or less diagrammatic view of a press such as shown in Fig. 1, illustrating the variable speed drive between the motor and the fly wheel of the press, and the mechanism whereby the fly wheel may be accelerated in response to engagement of the fly wheel clutch, from a minimum speed to a predetermined maximum speed, and decelerated from that maximum speed to the minimum speed in response to actuation of the clutch to disengage the fly wheel from the crank shaft;

Fig. 3 is a top plan view illustrating schematically the arrangement of the levers by which the fly wheel and crank shaft clutch are actuated, and by which operation of the variable speed drive is effected;

Fig. 4 is a view in section, taken on line IV—IV of Fig. 2, showing a portion of the fly wheel and a part of the shot pin clutch which is secured to the hub of the fly wheel;

Fig. 5 is a view in perspective of the end of the crank shaft on which the fly wheel is mounted, illustrating the crank shaft brake and the actuator for shot pin of the clutch;

Fig. 6 is a view in perspective of the shot pin of the clutch, and the pivoted wedge member of Fig. 5;

Fig. 7 is an enlarged view in section and partially fragmentary of the fly wheel and clutch, showing the pin of the clutch in engagement with the fly wheel; and Fig. 8 is a partial view, in plan, of the shot pin and the fly wheel clutch member, illustrating the construction of the end of the pin that engages the fly wheel, the manner in which the pin is engaged with the fly wheel, and the manner in which the pivoted wedge of Fig. 6 acts on the pin to retract it to disengaged position.

Figure 1:
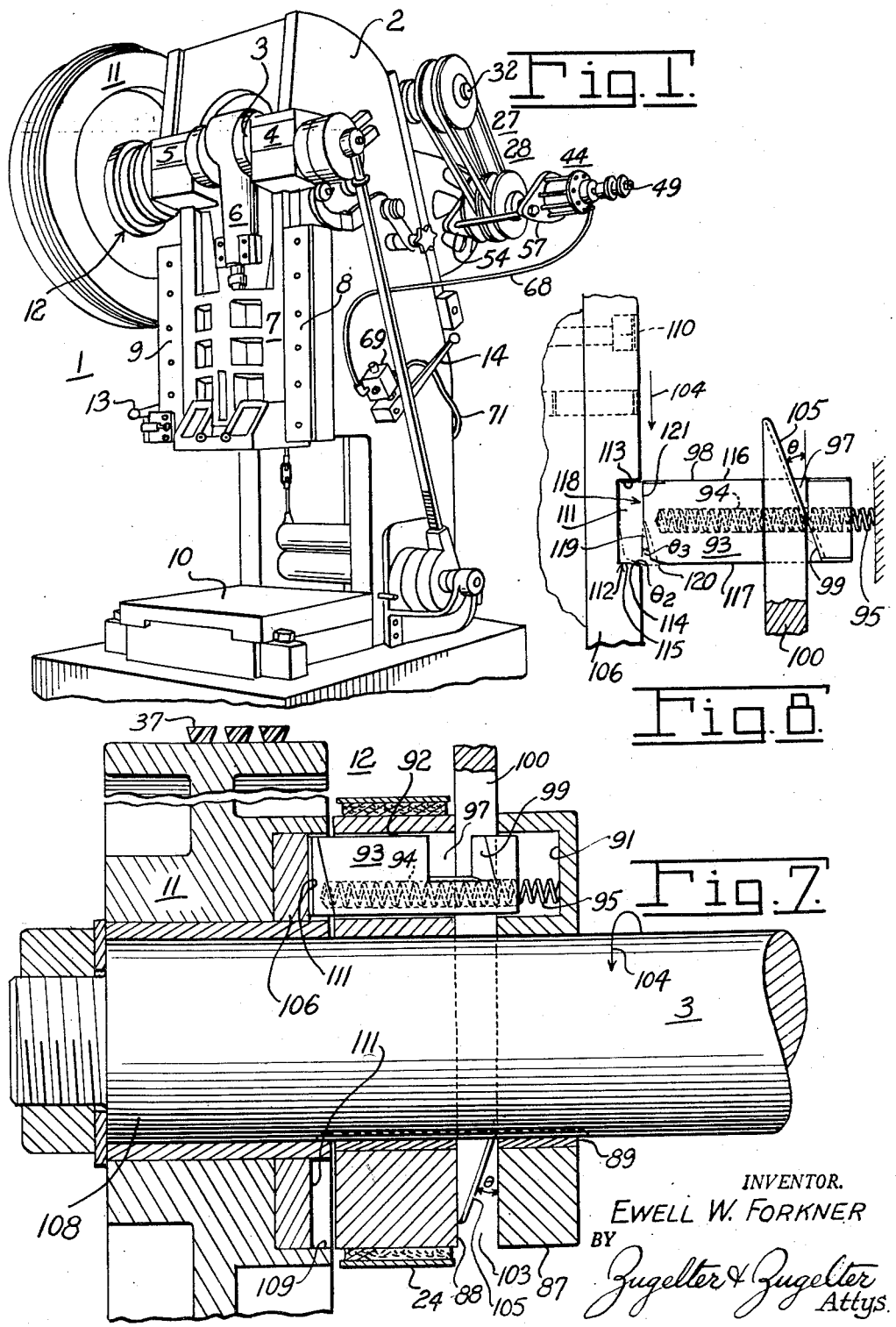

In Fig. 1 of the drawings, a press 1 of the punch and blanking press type is illustrated, that includes a frame 2 on which a crank shaft 3 is supported in main bearings 4 and 5. The crank shaft is provided with a connecting rod 6, that is connected to a ram or plunger 7, which is reciprocated vertically in guides or ways 8 and 9. As will be understood, the lower face or end of the ram 7, when in use, is provided with a die member (not shown) that cooperates with another die member (not shown) secured to the platen or base 10 of the press. One end of the crank shaft is provided with a fly wheel 11 and a clutch 12 of the shot pin type, for engaging and disengaging the fly wheel and crank shaft.

The shot pin clutch 12 may be operated by a lever 13 mounted on the fly wheel side of the press, or by another lever 14 mounted on the opposite side of the press. As shown in Fig. 3, lever 13 is mounted on a cross shaft 15 extending through the frame of the press, and supported in bearings at 16 and 17.

Lever 13 is connected by a connecting link 18 which, in turn, is connected to the pin-actuating mechanism shown in Figs. 5 and 6 and 8, which will be described infra. Lever 14 may be used to engage the clutch or disengage it from the side of the machine opposite that on which lever 13 is mounted. It is also used to actuate mechanism that accelerates and decelerates the variable speed drive for the press, as will be described infra. When lever 13 is pulled downwardly to engage the shot pin clutch 12, a spring pressed pin 21 drops into a notch 22 in lever 13, holding the lever in clutch-engaging position. By striking the lever downwardly and slightly outwardly, pin 21 is released from lever 13, which causes the clutch-actuating mechanism to disengage the fly wheel from the crank shaft.

A band brake 24 (see Fig. 5), which is also actuated by the levers 13 or 14 and the link 18 when the clutch is disengaged, is provided to stop the crank shaft 3 when the clutch 12 is disengaged, the fly wheel 11 continuing to turn on the end of the crank shaft.

Figure 2:
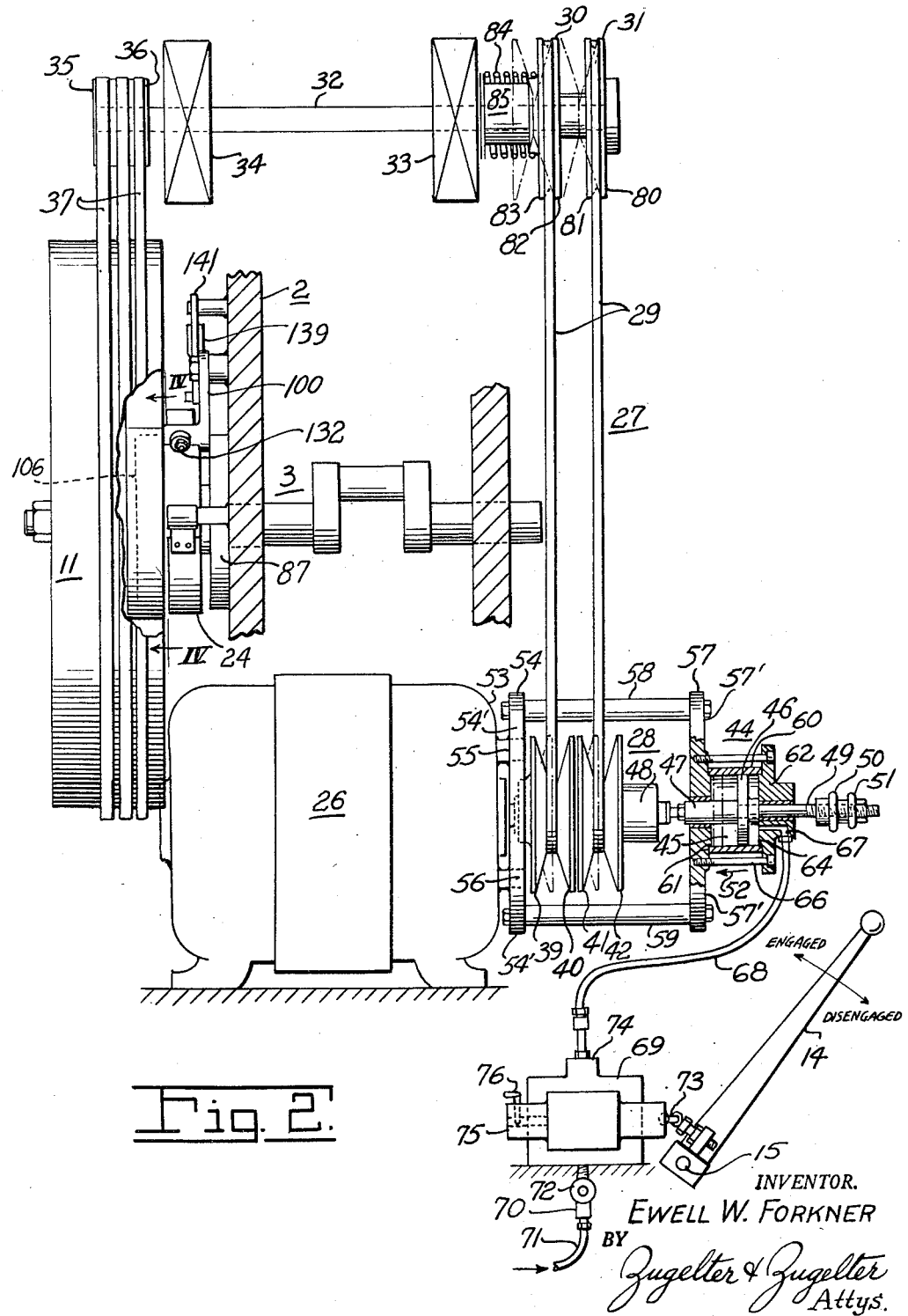

The crank shaft 3 is driven by a motor 26 (see Fig. 2) through a variable speed transmission 27. The transmission 27 includes, as shown in Figs. 2, an adjustable diameter pulley arrangement 28 mounted on the motor shaft, and on which belts 29 operate. Belts 29 run on adjustable diameter pulleys 30 and 31, that are mounted on a jack shaft 32, supported in bearings 33 and 34, respectively, on the press frame. The fly wheel end of jack shaft 32 is provided with a pair of fixed diameter pulleys 35 and 36, over which belts 37 are trained. These belts pass over the fly wheel 11, as shown in Figs. 1 and 2, and drive the same continuously while motor 26 is running.

The pulley arrangement 28 and the pulleys 30 and 31 may be of any well known type. As shown, the pulley arrangement 28 comprises two separate pulleys, one of which includes a pair of disks 39 and 40, and the other of which includes a pair of disks 41 and 42. Disks 39 and 41 are keyed to the motor shaft and held against movement axially of the shaft, while disks 40 and 42 are slidably keyed to the motor shaft. The adjacent faces of disks 39 and 40 and 41 and 42, respectively, are disposed at an angle to each other so as to form, between the respective pairs, V-grooves. When the disks 39–42 are in the full-line position shown in Fig. 2, the effective diameter of the pulley mechanism 28 is the minimum diameter. When these disks 40 and 42 are moved longitudinally of the motor shaft to the dotted-line positions thereof, the effective diameter of the pulley mechanism is at a maximum.

The position of disks 40 and 42 axially of the motor shaft, is controlled by a diameter-changing mechanism 44. Mechanism 44 comprises a power cylinder 45, having a piston 46 therein. One end of the piston is provided with a rod 47, that is connected to the hub 48 of disk 42. The opposite face of the piston is provided with a rod or stem 49, on which is mounted an adjustable stop nut or collar 50, and a lock nut 51. Nut 51 acts as a lock nut for stop 50. By turning the stop nut 50 inwardly towards the power cylinder, the length of the stroke of piston 46 to the left, or in the direction of arrow 52, may be pre-set, and by so doing, pre-set the maximum effective diameter of the pulley mechanism 28. The travel of the piston 46 in the opposite direction is limited by the head of the cylinder.

The pulley-adjusting mechanism 44 is mounted on the end frame 53 of the motor by means of a support that comprises a plate 54, secured to the motor end frame at 55 and 56, and a plate 57, which is secured to plate 54 by means of spacer bars 58 and 59. The main portion of plates 54 and 57 may be substantially circular, from which ears 57' and 54' extend. The central portion of plate 57 forms one cylinder head of the power cylinder 45.

The power cylinder 45 comprises an open-ended cylinder 60, one end of which receives a shoulder 61 on plate 57. The opposite end of the cylinder is provided with a head 62 having a shoulder 64 which is received in the outer end of the cylinder 60. Bolts 66 secure the head 62 and the cylinder 60 to the plate 57 in operative pressure-tight relationship.

An inlet port 67 is formed in the cylinder head 62, and that port is connected by a conduit or pipe 68 to a control valve 69. The control valve is provided with an inlet connection 70, that is connected to a supply pipe 71, to which a source of fluid pressure, such as air pressure, at constant value, is connected. The inlet fitting 70 of the valve is provided with a needle valve or restriction 72, by means of which the rate at which air is supplied to the power cylinder, may be controlled, thereby controlling the rate at which the pulley mechanism 28 is increased from its minimum to its maximum diameter.

The valve 69 has a plunger or stem 73, which controls the supply of air to the outlet port 74 of the valve, and also provides for exhausting air from the power cylinder through an exhaust port 75. The exhaust port 75 may have a fixed restriction therein, or a needle valve 76, by means of which the rate at which air is exhausted from the power cylinder may be controlled, thereby regulating the rate at which the pulley mechanism 28 is decreased from its maximum effective diameter to its minimum effective diameter.

The valve plunger or stem 73 is actuated by lever 14. When the clutch 12 is engaged by pulling lever 13 downwardly, or moving lever 14 upwardly, as in Fig. 2, clutch 12 is not only engaged, but the valve stem 73 is moved to "on" position, in which position air is delivered to cylinder 60, whereby piston 46 is moved in the direction of arrow 52. When the clutch lever 13 is released from the pin 21, clutch 12 is disengaged and, at the same time, the valve stem 73 is moved to the position where the inlet port 72 of the valve is closed, and the power cylinder 60 is connected to the exhaust port 75. By means of the restriction 76, the rate at which air is exhausted from cylinder 60 is regulated, whereby the rate at which the effective diameter of the pulley mechanism 28 is decreased from its maximum to its minimum diameter.

The pulleys 30 and 31 comprise disks 80 and 81 and 82 and 83, respectively. Disks 80 and 82 are fixed to the jack shaft 32, while disks 81 and 83 are slidably keyed to the jack shaft. A strong compression spring 84 is disposed about a hub 85 of disk 83, and between the bearing 33 and disk 83. Spring 84 urges the disks 83 and 81, respectively, towards their cooperating disks 83 and 80. As is evident by inspection of Fig. 2, the adjacent faces of disks 80 and 81 and 82 and 83 are inclined towards each other, so as to form a V-groove between them.

When air pressure is supplied to the power cylinder 60 and piston 46 caused to move in the direction of arrow 52, the effective diameter of the pulley mechanism 28 is increased, thereby increasing the tension on belts 29. As the belt tension increases, the disks 83 and 81 are separated, and the amount of separation is proportional to the increase in diameter of the pulley mechanism 28. As disks 80, 81 and 82, 83 separate, the apexes of the V-grooves move in towards the center of the jack shaft, thereby decreasing the effective diameters of pulleys 31 and 30 while, at the same time, the effective diameter of the pulley mechanism 28 is increasing. Therefore, the speed of the jack shaft 32, the fly wheel 11 and the crank shaft 3 are increased. The speed of the crank shaft 3 and the fly wheel 11 is automatically increased from a minimum speed to a maximum speed; likewise, that speed is automatically decreased from its maximum to its minimum speed. By this arrangement, the pin clutch 12 is engaged with the fly wheel when the fly wheel is rotating at its minimum speed, and is disengaged when the fly wheel is rotating at its maximum speed.

As illustrated in Figs. 2, 5 and 7, the pin clutch 12 is provided with a band brake 24. That brake is applied slightly before the pin clutch is disengaged from the fly wheel, to thereby insure that the crank shaft will come to rest at a predetermined point. Ordinarily, in punch presses of the type herein illustrated, the crank shaft should come to a positive stop when the crank of the crank shaft has reached the top of its stroke. The brake is released when the pin clutch engages the fly wheel with the crank shaft. The details of construction of the brake and the pin clutch will be described in the following.

As shown in Fig. 7, the shot pin clutch 12 comprises spaced members 87 and 88, that are mounted on the crank shaft 3 on the inside of the fly wheel 11, and secured to the shaft by a key 89. Member 87 is provided with a socket 91, and member 88 is provided with a slide-way 92, that is aligned with the socket 91. The clutch includes a pin 93, that is slidable in slide-way 92 and the socket 91. The pin is provided with a blind bore 94, in which a coiled compression spring 95 is received. The outer end of the spring 95 abuts the wall of the socket 91, as shown. The spring 95 therefore urges the pin towards the fly wheel.

Pin 93 is provided with a slot 97 in its outer face, that extends the full width of the pin, as shown. On the face opposite the pressure face 98 of the pin, is a cam surface 99 that cooperates with a wedge lever 100. Lever 100 is pivotally mounted on a pin 101, that is threaded into a boss 102 on the side frame member adjacent the fly wheel 11.

The wedge lever 100, as shown in Figs. 5 and 6, hangs downwardly with the point thereof lying in the space 103 between members 87 and 88. In the perspective view of Fig. 5 and Fig. 6, the clutch is seen looking from the rear of the fly wheel 11, towards the front of the machine. When so viewed, the crank shaft 3 turns in the direction of arrow 104, when the pin 93 is in engagement with the fly wheel.

As may be seen in Figs. 6 and 8, the end of lever 100 is pointed and provided with a face 105, that is inclined an angle θ with the right-hand side of the lever, as viewed in Fig. 8, or the inside face of the lever, as viewed in Fig. 6. The face 105 is also inclined inwardly from the top to bottom, so that it will operate properly with the inclined face 99 on the pin 93. When the pin 93 is engaged, as shown in Fig. 7, and lever 100 is released so as to move into the space 103, the face 105 of the lever 100 engages the face 99 of the pin. As the crank shaft and fly wheel are turning in the direction of arrow 104, the point of the lever 100 moves inwardly through the slot 97, to effect the cam action of the faces 99 and 105, by which the pin 93 is disengaged from the fly wheel, as shown in Fig. 8.

The shot pin clutch 12 also includes a member 106, which is a ring having a circular hole at the center for receiving the outer end 108 of the crank shaft. The ring 106 is received in an annular recess 109, formed in the hub of the fly wheel 11. That ring, as shown in Fig. 4, is pressed into the recess 109 and secured in place by screws 110, the heads of which are counter-sunk so as to be inside the outer surface thereof. The fly wheel 11 and the ring 106 rotate freely on the end 108 of the crank shaft, when the clutch is disengaged.

Ring 106 may be provided with one or more sockets or notches 111, for receiving the shot pin 93. For purposes of description, sides 112 and 113 of notches 111 are designated the leading and trailing sides thereof; also, side 113 may be designated the pressure of impact face, as that is where the driving force of the fly wheel is applied to pin 93. As shown in Fig. 8, the outer portion 114 of leading edge or side 112 of notch 111 is inclined at an angle θ2, to the outer face of the ring 106. The inclined face 114 terminates at approximately one-half the depth of the notch or slot 111, from which point the side portion 115 is straight and at right angles to the bottom of the notch or slot. The trailing wall or side 113 of the notch is straight and perpendicular to the face of the ring.

The pin 93, as may be seen in Figs. 5, 6, 7 and 8, is substantially rectangular and approximately square in transverse section. The width between faces 116 and 117 of the pin is only slightly less than the distance between the sides 112 and 113 of the notches 111, as measured at the bottom of the notches. The clearance between the pin and the notch sides 112 and 113, when it enters a notch 111, is such that the pin has a sliding fit therein. In order to cause the pin 93 to enter a notch 111, the end face 118 of pin 93 is provided with rearwardly extending inclined faces 119 and 120, respectively.

The angle of face 120 is the same as angle θ2 of face 114, whereas the angle θ3 of face 119 is substantially less than the angle θ2. The angle face 119 allows the pin 93 to be lead into the notch 111 before the trailing side 113 engages the pressure face 116 of the pin. The angle face 120 seats on the angle face 114, thereby forcing the pressure face 116 of the pin against the pressure face 113 of a notch 111, and also limits travel of the pin into the notch 111.

As the wheel 11 turns, the leading edge 112 of a notch 111 passes across the flat portion 121 of the face 118 of the pin, until the inclined face 119 is over the corner formed by the angular face 114 of the notch 111. When that point is passed, the pin starts moving into the notch. When angle face 120 engages face 114, the pin is led into the notch and the pressure faces 113 and 116 of the notch and pin are engaged. The movement of the pin 93 inwardly into a notch 111 is indicated by the full-line and the dotted-line positions thereof in Fig. 8. By shaping the ring-engaging end of pin 93 as above described, the pin will seat in a notch 111 with very little impact and noise, even though the tolerances are close and the fly wheel is rotating at speeds of the order of 100 R. P. M. The angle faces 114, 119 and 120 serve, also, to prevent the pin from sticking in a notch 111, so that it may be effectively and easily retracted by wedge lever 100.

The clutch members 87 and 88, and the pin 93 are so positioned and secured to the crank shaft 3, that the pin will be disengaged from the clutch ring 106 slightly ahead of the top of the stroke of the crank. At that point, the brake band 24 is applied.

As shown in Figs. 5 and 7, the clutch member 88 also serves as a brake drum for the crank shaft 3. One end of the brake band 24 (see Fig. 5) is anchored to a pin 130, that is threaded into a boss 131 on the side frame member adjacent the fly wheel 11. The other end of the brake band is connected to a bolt 132, that extends through a boss 133 of a crank arm 134, which is integral with the wedge lever 100. A compression spring 135 is placed about the bolt 132 and between the head 136 thereof and the boss 133, so that the free end of the band will be yieldingly held in whatever position to which it is adjusted by means of the nut 137 on the bolt.

The wedge lever 100 is connected to lever 13 by the connecting link 18 to a rod 138, that is slidably received in a boss 138', secured to the side frame member adjacent the fly wheel 11. The rod 138 is connected to a toggle 139, comprising toggle levers 140 and 141. Toggle lever 140 is connected by a pin 142 to the wedge lever 100, at 143. The outer end of toggle lever 141 is connected by a pin 146 to a boss 147, secured to the side frame member. The adjacent ends of the toggle levers 140 and 141 are pin-connected by a pin 147', to which the upper end of rod 138 is also connected. A compression spring 148 is disposed about rod 138, and between boss 138' and a flange 149 at the upper end of rod 138. The compression of spring 148 is of such value as to urge lever 100 into the space between clutch members 87 and 88, and to therefore be normally in a position to retract the pin 93 from either of notches 111 in the fly wheel clutch ring 106. In that position, the toggle links 140 and 141 are approximately on dead-center, thereby tending to hold the lever 100 in the clutch-disengaging position and, at the same time, applying the band brake 24 to the member 88.

When the lever 13 is pulled downwardly, rod 18 is pulled downwardly with it, thereby compressing spring 148 and breaking the toggle 139, and moving wedge lever 100 outwardly and away from the shot pin 93. As the lever 100 turns about pin 101 in the direction of arrow 151, the free end of the brake band 24 is moved downwardly, thereby releasing it from member 88.

As the fly wheel, which is continuously turning, presents one or the other of notches 111 into a position where the pin 93 can be led into the same, the crank shaft will turn as soon as the pin has seated, as in Fig. 8. Wedge lever 100 is held in clutch-engaged position, as stated previously, by the pin 21. If, for any reason, it is desired to stop the crank shaft of the press, and to bring it to a stop at the top of its stroke, lever 13 is given a light blow by the hand, in a direction to force it downwardly and outwardly to disengage the pin 21 therefrom. As soon as the pin 21 is disengaged, the spring 148 pulls the lever 13 upwardly, thereby moving the rod 18 upwardly, and actuating the toggle 139 to its dead-center position. When in that position, the wedge lever 100 has moved to the position where the point of lever 100 will pass through pin slot 97, thereby retracting the pin from the fly wheel notch 111 and, at the same time, applying the band brake 24 to arrest the fly wheel at the top of its stroke.

As lever 13 is operatively connected through shaft 15 to lever 14, it will be apparent that the valve 69 is actuated simultaneously with the operation of clutch 12 to engage or disengage the fly wheel and shaft. The valve 69, as explained supra, controls the shift of the pulley mechanism 28 to accelerate the fly wheel and crank shaft from the moment the shot pin clutch is engaged, to the maximum running speed of the fly wheel, and the deceleration of the fly wheel from the maximum to the minimum running speed, the moment the clutch is disengaged.

Having thus described the invention, it will be apparent to those skilled in this art that various modifications and changes may be made in the illustrated embodiment thereof, without departing from either the spirit or the scope of the invention.

Therefore, what is claimed as new and desired to be secured by Letters Patent is:

1. A drive for punch and blanking presses and the like, provided with a crankshaft, a flywheel, a clutch for engaging and disengaging the flywheel and shaft, and means for actuating said clutch, said flywheel drive comprising a motor having an adjustable diameter pulley on the shaft thereof, a jack shaft having an adjustable diameter pulley thereon, a belt running over said adjustable diameter pulleys, a fixed diameter pulley on said jack shaft aligned with the flywheel, a belt running over said fixed diameter pulley and said flywheel, means for actuating one of said adjustable diameter pulleys between high speed and low speed drive, and a common control means for effecting substantially simultaneous operation of said flywheel clutch actuating means and said pulley adjusting means to effect adjustment of said adjustable diameter pulley from low speed drive to high speed drive in response to the flywheel clutch being engaged, and adjusting said pulley from high speed drive to low speed drive when the flywheel clutch is disengaged.

2. A drive according to claim 1, characterized by the fact that one of said adjustable diameter pulleys comprises a disk fixed to its shaft and another disk slidably keyed to said shaft, that means are provided for normally urging said disks toward each other, that the adjacent faces of said disks are disposed at an angle to each other to form a V-groove whose apex is adjacent the said shaft, and that the other adjustable pulley comprises a pair of disks similar to the disks of the other adjustable pulley, one of which disks is fixed to its shaft and the other of which is slidably keyed thereto, and that the means for adjusting the diameters of said pulleys is coupled to said latter slidably keyed disk, and arranged to move said one disk toward or away from the other, thereby to change the speed of said drive.

3. A drive according to claim 1, characterized by the fact that the variable diameter pulley to which the adjusting means is coupled, comprises a pair of disks, one of which is fixed to its shaft, and the other of which is slidably keyed thereto, that the adjacent faces of said disks are disposed at an angle to each other to form a V-groove, that the adjusting means is coupled to said slidably keyed disk, said adjusting means comprising a cylinder having a piston therein, said piston having a rod connected to said slidably keyed disk, that a valve is provided for supplying and controlling the admission of motive fluid to said cylinder to actuate said slidably keyed disk toward the other disk for high-speed drive, and for exhausting fluid from said cylinder, whereby the disk may be moved away from its adjacent disk by belt tension to low-speed drive, said valve being coupled to the flywheel clutch actuating means, to be actuated substantially simultaneously therewith.

4. A drive according to claim 1, characterized by the fact that the variable diameter pulley to which the adjusting means is coupled, comprises a pair of disks, one of which is fixed to its shaft and the other of which is slidably keyed thereto, that the adjacent faces of said disks are disposed at an angle to each other to form a V-groove, that the adjusting means is coupled to said slidably keyed disk, said adjusting means comprising a cylinder having a piston therein, said piston having a rod connected to said slidably keyed disk, that a valve controls the admission of motive fluid to said cylinder to actuate said slidably keyed disk toward the other adjacent disk for high-speed drive, and for exhausting said fluid from said cylinder, whereby the disk may be moved away from its adjacent disk by belt tension to low-speed drive, said valve being coupled to the flywheel clutch actuating means to be actuated substantially simultaneously therewith, and means for controlling the rate at which fluid is exhausted from said cylinder, to thereby control the rate at which the flywheel is decelerated from high speed to low speed.

5. A drive according to claim 1, characterized by the fact that the variable diameter pulley to which the adjusting means is coupled, comprises a pair of disks, one of which is fixed to the motor shaft, and the other of which is slidably keyed to said motor shaft, that the adjacent faces of said disks are disposed at an angle to each other to form a V-groove, that the adjusting means is coupled to said slidably keyed disk, said adjusting means comprising a cylinder having a piston therein, said piston having a rod connected to said slidably keyed disk, that a valve controls the admission of motive fluid to said cylinder to actuate said slidably keyed disk toward the other disk for high-speed drive, and for exhausting said fluid from said cylinder, whereby the disk may be moved away from said fixed disk by belt tension to low-speed drive, said valve being coupled to the flywheel clutch actuating means, to be operated substantially simultaneously therewith.

6. A drive according to claim 1, characterized by the fact that means are provided for controlling the rate at which the pulley adjusting means adjusts said pulley from one to the other of said high and low speed positions.

7. A drive according to claim 1, characterized by the fact that means are provided for controlling the rate at which the pulley adjusting means adjusts said pulley from one to the other of said high and low speed positions, and that means are provided for adjusting said pulley adjusting means to a predetermined value of low speed.

8. A drive according to claim 1, characterized by the fact that means are provided for controlling the rate at which the pulley adjusting means adjusts said pulley from one to the other of said high and low speed positions, and that means are provided for adjusting said pulley adjusting means to predetermine the value of said low speed, and that means are provided for adjusting said pulley adjusting means to predetermine the value of said high speed.

9. A drive according to claim 1, characterized by the fact that the adjustable diameter pulley, which is actuated by said pulley adjusting means, is coupled to the shaft of the motor, and that the means for engaging and disengaging the flywheel clutch is arranged to disengage the clutch when the crankshaft is approximately at the top of its stroke, and that means are provided for applying a braking force to said shaft to stop the same when the flywheel clutch is disengaged.

10. A drive for punch and blanking presses and the like, provided with a shot pin clutch for engaging and disengaging the flywheel from the crankshaft at predetermined low and high speeds of the flywheel, said drive comprising a shot pin clutch member secured to the flywheel, a shot pin slidably secured to the crankshaft and normally urged into engagement with the flywheel clutch member, a motor, a variable speed transmission connecting the motor and the flywheel, means for actuating the shot pin out of engagement with the flywheel clutch member and for releasing the same into engagement therewith, and means controlled by said shot pin actuating means for automatically adjusting the transmission to reduce the speed of the flywheel from high speed to low speed in response to the shot pin actuating means actuating the shot pin out of engagement with the flywheel clutch member, and automatically adjusting said transmission to accelerate the flywheel from said low speed to high speed in response to the shot pin being actuated by said shot pin actuating means into engagement with the flywheel clutch member.

11. A drive according to claim 10, in which the transmisison speed adjusting means is provided with means for controlling the rates of deceleration and acceleration of the flywheel.

12. A drive according to claim 10, in which a brake is provided for the crank shaft, and that a connection is provided between the shot pin actuating means and said brake, for applying the brake when the shot pin is disengaged from the flywheel clutch member, and for releasing the brake when the shot pin has been actuated into engagement with the flywheel clutch member.

References Cited in the file of this patent

UNITED STATES PATENTS

| | | |
|---|---|---|
| 1,491,006 | Fletcher | Apr. 22, 1924 |
| 1,716,594 | Metcalf | June 11, 1929 |
| 1,724,588 | Honigmann | Aug. 13, 1929 |
| 2,078,196 | Heyer | Apr. 20, 1937 |
| 2,089,711 | Reeves | Aug. 10, 1937 |
| 2,492,284 | Heim | Dec. 27, 1949 |
| 2,503,425 | Toby et al. | Apr. 11, 1950 |
| 2,512,816 | Sweger | June 27, 1950 |